United States Patent [19]
Abber et al.

[11] Patent Number: 5,763,525
[45] Date of Patent: *Jun. 9, 1998

[54] ERASABLE MARKING COMPOSITION

[75] Inventors: Herman Abber, Brockton; Robert H. Lussier, Weymouth; Dianne E. Porter, Southboro, all of Mass.

[73] Assignee: Avery Dennison Corporation, Pasadena, Calif.

[*] Notice: The term of this patent shall not extend beyond the expiration date of Pat. No. 5,629,363.

[21] Appl. No.: 483,208

[22] Filed: Jun. 7, 1995

Related U.S. Application Data

[63] Continuation-in-part of Ser. No. 194,466, Feb. 10, 1994, which is a continuation-in-part of Ser. No. 97,461, Jul. 27, 1993, abandoned, which is a continuation-in-part of Ser. No. 965,803, Oct. 23, 1992, abandoned.

[51] Int. Cl.$^6$ ............................. C08L 9/08; C09D 11/18
[52] U.S. Cl. ......................... 524/575; 523/160; 523/161
[58] Field of Search ........................... 523/160, 161; 524/575

[56] References Cited

U.S. PATENT DOCUMENTS

| | | | |
|---|---|---|---|
| 4,297,260 | 10/1981 | Ferree, Jr. et al. | 523/161 |
| 5,048,992 | 9/1991 | Loftin | 106/22 |
| 5,217,255 | 6/1993 | Lin et al. | 106/23 B |
| 5,338,793 | 8/1994 | Loftin | 524/571 |
| 5,362,167 | 11/1994 | Loftin | 524/575 |
| 5,389,717 | 2/1995 | Santini et al. | 524/575 |

FOREIGN PATENT DOCUMENTS

WO 94/10251  5/1994  WIPO.

*Primary Examiner*—Peter A. Szekely
*Attorney, Agent, or Firm*—Kriegsman & Kriegsman

[57] ABSTRACT

A marking composition erasable from both porous and non-porous marking substrates using substantially non-abrasive mechanical erasers. The marking composition preferably has a viscosity of less than about 10 cps and a surface tension between about 20 dynes/cm and about 40 dynes/cm and is particularly well-suited for use in capillary feed markers and similar writing instruments. In a first preferred embodiment, the marking composition comprises a water-insoluble colorant and a blend of two different non-carboxylated styrene-butadiene latex emulsions. The first latex emulsion, an embodiment of which is commercially available as PLIOLITE® LPF-2108, contains about 40% total solids by weight and has a viscosity of about 30 cps, a pH of about 11.2, a Mooney value of about 150–160, a surface tension of about 55–60 dynes/cm, and a bound styrene content of about 21–29%. The second non-carboxylated styrene-butadiene latex emulsion, an embodiment of which is commercially available as Butofan® NS 103, contains about 47% total solids by weight and has a viscosity of about 200 cps, a pH of about 9.7, a Mooney value of about 70–75, a surface tension of about 62 dynes/cm and a bound styrene content of about 24%. Preferably, the latex emulsion blend has a viscosity greater than about 50 cps, and the ratio of the second latex emulsion to the first latex emulsion is greater than or equal to about 75:25 and less than 100:0. The marking composition preferably further includes a shear-stabilizing agent, such as potassium oleate, as well as a preservative, an antioxidant, a fluorochemical surfactant and one or more anti-drying agents.

48 Claims, 3 Drawing Sheets

ERASABLE MARKING COMPOSITION

CROSS-REFERENCE TO RELATED APPLICATIONS

The present application is a continuation-in-part of presently pending U.S. patent application Ser. No.08/194,466, filed Feb. 10, 1994, which is a continuation-in-part of presently pending U.S. patent application Ser. No. 08/097,461, filed Jul. 27, 1993, now abandoned, which is a continuation-in-part of U.S. patent application Ser. No. 07/965,803, filed Oct. 23, 1992, now abandoned, in favor of presently pending U.S. patent application Ser. No. 08/139,560, filed Oct. 20, 1993. All of the foregoing patent applications are incorporated herein by reference.

BACKGROUND OF THE INVENTION

The present invention relates generally to erasable marking compositions and more particularly to erasable marking compositions that are erasable from both porous and non-porous marking substrates by substantially non-abrasive mechanical means.

When using writing instruments to produce written images, characters or highlight marks on a marking substrate, it is not necessarily desirable to obtain a high degree of indelibility. For example, one may want to be able to make a mark on a marking substrate which is easily erasable therefrom by substantially non-abrasive mechanical means. To be truly erasable, the marking composition must be capable of being substantially completely removed from the marking substrate to which it has been applied without significant damage to the marking substrate. As can readily be appreciated, this goal is often particularly difficult to attain when the marking substrate is porous, like conventional stationery paper, since the colorant particles of most marking compositions tend to penetrate the pores of a porous marking substrate when the composition is applied thereto, thereby impeding the subsequent erasure thereof.

One type of erasable marking composition adapted for use on porous marking substrates, such as conventional stationery paper, includes (a) an emulsion comprising a discontinuous film-forming phase and a continuous aqueous phase; and (b) a colorant. The film-forming phase and the colorant are typically selected so that, when the composition is applied to a porous marking substrate, the emulsion breaks causing (1) the continuous phase of the emulsion to evaporate and/or to be absorbed by the porous marking substrate, (2) the film-forming phase to coalesce into a film formed on the surface of the porous marking substrate, and (3) the colorant to associate itself with the film, as opposed to being associated with the continuous phase of the emulsion absorbed by the porous marking substrate. In this manner, the colorant can readily be removed from the substrate by stripping the colorant-laden film from the substrate using substantially non-abrasive mechanical means, such as an ordinary pencil eraser. To promote an association between the colorant and the film, some inks exploit a charge attraction between the colorant and the film. Other inks exploit a hydrophobicity shared by the colorant and the film.

An example of the aforementioned type of marking composition is disclosed in U.S. Pat. No. 4,297,260, inventors Ferree, Jr. et al., which issued Oct. 27, 1981, and which is incorporated herein by reference. The Ferree, Jr. et al. composition comprises an emulsion having a discontinuous phase of a carboxylated styrene-butadiene rubber latex copolymer and a continuous phase of water, and a basic dye (e.g., a salt of a triaryl methyl cation). The emulsion, when applied to paper, allegedly forms a non-penetrating rubber film on the paper with a majority of the dye ions associating with the rubber film. According to the patent, the rubber film, together with the associated dye, can then be removed from the paper by an ordinary pencil eraser.

However, one problem noted by the present inventors with the Ferree, Jr. et al. composition is that, as the composition is being formulated, a sludge tends to form which must be filtered out of the composition before it can be used. The sludge appears to be a by-product of a reaction between the positively-charged dye ions and the negatively-charged rubber. As can readily be appreciated, the filtering of the sludge from the composition creates cost and processing problems, as well as disposal problems. Furthermore, it appears that the reaction resulting in sludge formation limits the amount of dye that is available for association with the rubber film when the composition is applied to paper and, therefore, unacceptably limits the intensity of color in the marking that can be realized.

Another example of the above-described type of marking composition is disclosed in U.S. Pat. No. 5,362,167, inventor Loftin, which issued Nov. 8, 1994, and which is incorporated herein by reference. The Loftin composition, which is said to be a non-shear-thinning ink having a viscosity of between 10 cps and 30 cps (preferably between 10 cps and 20 cps), comprises water, a water-insoluble colorant and a styrene-butadiene latex emulsion. The styrene-butadiene latex emulsion has a viscosity of less than about 50 cps and includes a styrene-butadiene copolymer having a styrene content of less than 35%. According to the Loftin patent, a particularly preferred styrene-butadiene latex emulsion is PLIOLITE® LPF-2108, an emulsion commercially available from Goodyear Chemicals of Akron, Ohio. According to the Loftin patent, PLIOLITE® LPF-2108 has a Brookfield viscosity (25° C.) of about 30 cps, a Mooney viscosity of greater than 100, a solids content of about 40%, and a styrene content of about 29%. The Loftin composition also preferably includes a release agent (preferably a silicone release agent) and an antioxidant (preferably a cresol). The release agent allegedly provides a film between the paper surface and the marking to facilitate removal of the marking from the paper surface. The antioxidant allegedly inhibits the oxidation of the styrene-butadiene copolymer, thereby extending the time period over which the composition is erasable.

Still another example of the above-described type of marking composition is disclosed in U.S. Pat. No. 5,389,717, inventors Santini et al., which issued Feb. 14, 1995, and which is incorporated herein by reference. The Santini et al. composition, which is said to have a surface tension of at least about 50 dynes/cm, preferably about 50–55 dynes/cm, and a viscosity of about 1.5 cps to about 6.0 cps for use in porous-tipped writing instruments, comprises a non-carboxylated styrene-butadiene resin emulsion, a colorant and a solvent formulated so as to form an erasable marking composition. According to the Santini et al. patent, the resin preferably has a styrene-butadiene ratio of about 29:71. PLIOLITE® 2108 is said to be a particularly preferred resin emulsion. The Santini et al. composition also preferably includes a humectant and a preservative.

Still yet another example of the above-described type of marking composition is disclosed in the commonly assigned, above-referenced U.S. patent application Ser. No. 07/965,803, inventors Smith et al., filed Oct. 23, 1992. The Smith composition, which is particularly well-suited for use in porous tipped writing instruments, is a non-shear-thinning ink having a viscosity of less than 10 cps, preferably about 7 cps, and a surface tension of about 10 dynes/cm to about 60 dynes/cm, preferably about 25 dynes/cm to about 35 dynes/cm. The Smith composition includes a non-carboxylated styrene-butadiene latex emulsion preferably having about 24% bound styrene, a water-insoluble colorant, an anti-drying agent, an antioxidant, a fluorochemical surfactant and water. PLIOLITE® LPF-2108 is said to be one particularly preferred emulsion for use in the Smith composition. Butofan® NS 103 (commercially available from BASF Corporation, Charlotte, N.C.) is said to be another particularly preferred emulsion for use in the Smith composition.

Although the present inventors have found the above-described Smith composition to be generally satisfactory in various writing performance and erasability characteristics, the present inventors would, nevertheless, like to improve upon one or more of these characteristics.

SUMMARY OF THE INVENTION

It is an object of the present invention to provide a novel erasable marking composition.

It is another object of the present invention to provide an erasable marking composition as described above that is improved in at least some respects as compared to the above-described erasable marking compositions.

It is still another object of the present invention to provide an erasable marking composition as described above that can be used to make markings erasable from both porous marking substrates and non-porous marking substrates using substantially non-abrasive mechanical means.

For purposes of the present specification and claims, a "porous marking substrate" is defined to mean a marking substrate which is sufficiently porous to permit the penetration thereinto of colorants of the type typically found in conventional non-erasable inks and which, when contacted with the present composition, causes the emulsion therein to break. Examples of conventional porous marking substrates include, but are not limited to, conventional stationery papers and similar papers which have been treated in such a way that, when contacted with water, ions (e.g., protons and/or cations) are dissolved therefrom.

Also for purposes of the present specification and claims, a "non-porous marking substrate" is defined to mean a substrate which is insufficiently porous to permit the penetration thereinto of colorants of the type typically found in conventional non-erasable inks and which, when contacted with the present composition, causes the emulsion therein to break. Examples of non-porous marking substrates include, but are not limited to, smooth-surfaced writing panels made of glass, plastic, metal, sealed-wood, coated paper and the like.

Also for purposes of the present specification and claims, the term "substantially non-abrasive mechanical means" is intended to include, but is not limited to, dry cloths, tissues, ordinary pencil erasers and the like.

It is still yet another object of the present invention to provide an erasable marking composition as described above that is well-suited for use in, but not limited to use in, capillary feed markers and other porous-tipped writing instruments.

It is a further object of the present invention to provide an erasable marking composition as described above that maintains a high degree of erasability for an extended period of time.

Additional objects, as well as features and advantages, of the present invention will be set forth in part in the detailed description which follows, and in part will be obvious from the detailed description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

In furtherance of the above and other objects to be described or to become apparent below, there is hereinafter provided a marking composition that is erasable from both porous and non-porous marking substrates, said marking composition comprising in one embodiment:

(a) a latex emulsion blend comprising a first non-carboxylated styrene-butadiene latex emulsion and a second non-carboxylated styrene-butadiene latex emulsion, said latex emulsion blend being characterized by its ability to be transformed, upon being contacted with the surface of a porous marking substrate, from a first state in which said latex emulsion blend is stable to a second state in which said latex emulsion blend is unstable and the styrene-butadiene phase rapidly agglomerates to form a cohesive film deposited directly on the surface of the sheet of the porous marking substrate with low adhesion thereto; and (b) a colorant dispersed in the latex emulsion blend, the colorant being characterized by its association with the cohesive rubber phase film when said latex emulsion blend is transformed into said second state.

The above-described marking composition preferably has a viscosity of less than about 10 cps and has a surface tension of between about 20 dynes/cm and about 40 dynes/cm, more preferably between about 25 dynes/cm and about 35 dynes/cm. The latex emulsion blend of the aforementioned marking composition preferably has a viscosity of at least about 50 cps. In addition, said latex emulsion blend preferably comprises a first non-carboxylated styrene-butadiene latex emulsion which contains about 40% total solids by weight and which has a viscosity of about 30 cps, a pH of about 11.2, a Mooney value of about 150–160, a surface tension of about 55–60 dynes/cm, a particle size of about 650–700 Angstroms and a bound styrene content of about 21–29%, and a second non-carboxylated styrene-butadiene latex emulsion which contains about 47% total solids by weight and which has a viscosity of about 200 cps, a pH of about 9.7, a Mooney value of about 70–75, a surface tension of about 62 dynes/cm, a particle size of about 700 Angstroms and a bound styrene content of about 24%. An example of the first latex emulsion described above is PLIOLITE® LPF-2108, and an example of the second latex emulsion described above is Butofan® NS 103. Preferably, the ratio of the second latex emulsion to the first latex emulsion is greater than or equal to about 75:25 and is less than 100:0. More preferably, the ratio of the second latex emulsion to the first latex emulsion is about 95:5.

The above-described marking composition preferably further comprises a shear-stabilizing agent which is included in the composition to prevent coagulation of the discontinuous rubber phase under conditions of high shear, such as during formulation (i.e., mixing) of the composition or during application of the composition to a marking substrate. The shear-stabilizing agent is preferably a fatty acid salt. Potassium oleate is a particularly preferred shear-stabilizing agent and is preferably present in the marking composition in an amount approximating 1–4%, dry weight, of the dry weight of the non-carboxylated styrene-butadiene copolymer of the latex emulsion blend.

The above-described marking composition preferably further comprises an antioxidant, a preservative, one or more antidrying agents and a fluorochemical surfactant. The fluorochemical surfactant is included in the composition to reduce the surface tension of the composition to the range described above without unduly stabilizing the latex emulsion so as to prevent the emulsion from breaking when contacted with a porous or non-porous marking substrate.

In another preferred embodiment of the invention, the erasable marking composition does not comprise a blend of the above-described non-carboxylated styrene-butadiene latex emulsions, but rather, comprises only the non-carboxylated styrene-butadiene latex emulsion having a viscosity of about 200 cps, a pH of about 9.7, a Mooney value of about 70–75, a surface tension of about 62 dynes/cm, a particle size of about 700 Angstroms and a bound styrene content of about 24%.

The aforementioned marking composition also preferably includes a shear-stabilizing agent of the type described above, as well as an antioxidant, a preservative, one or more antidrying agents and a fluorochemical surfactant.

The present invention is also directed to a writing instrument containing the above-described erasable marking compositions and to a method for making erasable markings on both porous and non-porous marking substrates using the above-described erasable marking compositions.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In the drawings.

DETAILED DESCRIPTION OF PREFERRED EMBODIMENTS

Figure 1:
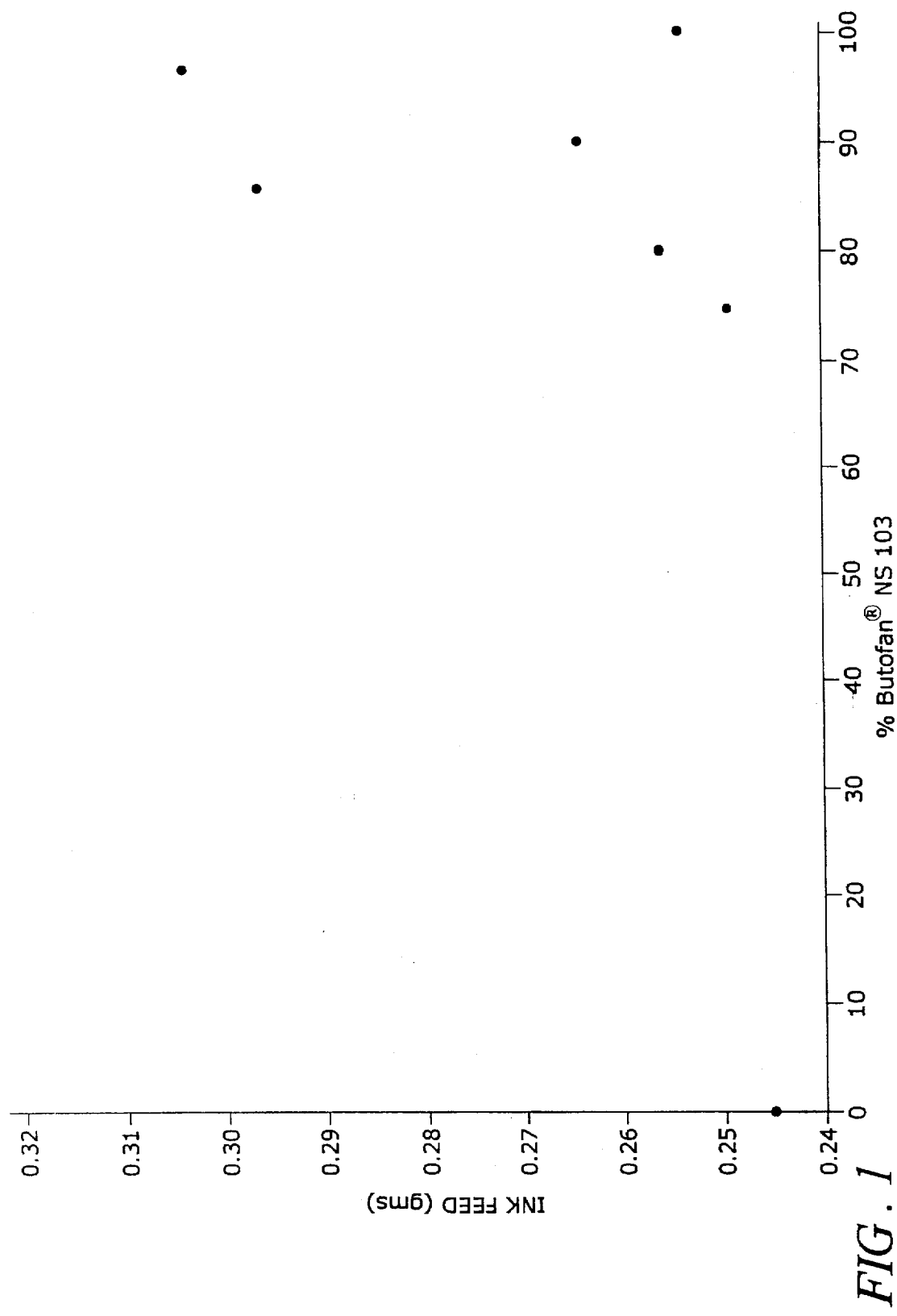
FIG. 1 is a graphic representation of ink feed through a capillary feed marker measured as a function of the ratio of Butofan® NS 103 to PLIOLITE® LPF-2108 in the erasable marking composition of the present invention.

The erasable marking composition of the present invention broadly comprises a non-carboxylated styrene-butadiene latex emulsion and a suitable colorant.

The present inventors have discovered that, by using particular types of non-carboxylated styrene-butadiene latex emulsions or by blending together two or more particular types of non-carboxylated styrene-butadiene latex emulsions, an erasable marking composition having unexpectedly superior erasability and writing performance characteristics can be obtained. More specifically, the present inventors have found that, when Butofan® NS 103 is used as the non-carboxylated styrene-butadiene latex emulsion for the present composition or when Butofan® NS 103 is blended together with PLIOLITE® LPF-2108 to form the non-carboxylated styrene-butadiene latex emulsion for the present composition, the resulting composition possesses erasability and writing performance characteristics that are surprisingly superior to those possessed by comparable erasable marking compositions which use PLIOLITE® LPF-2108 alone as the non-carboxylated styrene-butadiene latex emulsion.

As noted above, Butofan® NS 103, which is commercially available from BASF Corporation, Charlotte, N.C., contains about 47% total solids by weight and has a Brookfield viscosity (@25° C.) of about 200 cps, a pH of about 9.7, a Mooney value of about 70–75, a surface tension of about 62 dynes/cm, a particle size of about 650–700 Angstroms and a bound styrene content of approximately 24%±2%.

PLIOLITE® LPF-2108, which is commercially available from Goodyear Chemicals of Akron, Ohio, contains about 40% total solids by weight and has a Brookfield viscosity (@25° C.) of about 30 cps, a pH of about 11.2, a Mooney value of about 150–160, a surface tension of about 55–60 dynes/cm, a particle size of about 650 Angstroms and a bound styrene content of about 21–29%.

Preferably, the ratio of Butofan® NS 103 to PLIOLITE® LPF-2108 in the present composition is greater than or equal to about 75:25 and less than or equal to 100:0. A particularly preferred Butofane® NS 103:PLIOLITE® LPF-2108 ratio is about 95:5. Latex emulsions falling within the aforementioned ratio range have a Brookfield viscosity (@25° C.) greater than about 50 cps and a styrene content of about 25%.

The colorant included in the erasable marking composition of the present invention is typically a water-insoluble or water-dispersible pigment that is also oliophilic. Such pigments may be selected from among standard industry pigments which are known to be well-suited for being dispersed in aqueous systems and which are capable of associating with the rubber phase of a non-carboxylated styrene-butadiene latex emulsion, as opposed to being associated with the water phase thereof. Examples of such pigments are carbon black and ultra-fine fluorescent pigments, as well as mixtures thereof. It is anticipated that other pigments, dyes and toners which behave in the same manner may also be used in the composition of the present invention. The size of the pigment particles is also important. The pigment particles typically have a small diameter, preferably less than about 500 nm and more preferably about 50–150 nm. Generally, the pigment solids will be present in the composition in an amount up to about 5%, by weight, of the entire marking composition.

The erasable marking composition of the present invention preferably further includes a shear-stabilizing agent, which is included in the composition to prevent the highly undesirable coagulation of the discontinuous rubber phase of the emulsion under conditions of high shear, such as during formulation (i.e., mixing) of the composition or during application of the composition to a marking substrate. As can readily be appreciated, the unwanted coagulation of the emulsion can substantially curtail the usefulness of the marking composition. Surprisingly, the present inventors have found that the problem of coagulation does not occur with erasable marking compositions in which the latex emulsion consists exclusively of PLIOLITE® LPF-2108, but does occur where the erasable marking composition includes Butanol® NS 103. The shear-stabilizing agent of the present composition is preferably a fatty acid salt. Potassium oleate is an example of a particularly preferred shear-stabilizing agent. Another example of a shear-stabilizing agent is Modicol® S, a sulfated fatty acid commercially available from Henkel Corporation, Ambler, Pa. The shear-stabilizing agent is preferably present in the marking composition of the present invention in an amount approximating 1–4%, dry weight, of the dry weight of the non-carboxylated styrene-butadiene copolymer of the latex emulsion.

An added benefit arising from the inclusion of a shear-stabilizing agent in the erasable marking composition of the present invention is that markings made by the present composition possess an increased color intensity.

The erasable marking composition of the present invention preferably further includes one or more humectants. Suitable humectants include water-soluble organic ketones, esters and alcohols that do not have a significant deleterious effect on the composition or its properties and whose boiling point is relatively high, e.g., from about 140° C. to about 300° C. Examples of preferred humectants include Sorbitol (70% solids), glycerine, urea or a mixture thereof. The humectant(s) may be present in any suitable amount, preferably constituting up to about 15% by weight of the total erasable marking composition and more preferably constituting about 5–10% by weight of the total erasable marking composition.

The erasable marking composition of the present invention also preferably comprises a fluorochemical surfactant for reducing the surface tension of the composition to the range given below without unduly stabilizing the latex emulsion so as to prevent the emulsion from breaking when contacted with a porous or non-porous marking substrate. The erasable marking composition of the present invention preferably has a surface tension of between about 20 dynes/cm and about 40 dynes/cm, more preferably between about 25 dynes/cm and 35 dynes/cm. A preferred fluorochemical surfactant is Fluorad FC-129, a potassium salt of a fluorinated alkyl-carboxylate commercially available from 3M. Typically, the fluorochemical surfactant is included in the erasable marking composition of the present invention in an amount up to about 2% by weight of the total composition.

The erasable marking composition of the present invention preferably further includes small quantities of a preservative and an antioxidant. An example of a suitable preservative is Dowicil 75, which is commercially available from Dow Chemical Co., and an example of a suitable antioxidant is Octolite 453, which is commercially available from Textile Rubber and Chemical Company of Dalton, Ga.

The erasable marking composition of the present invention may also include other additives of the type commonly included in erasable and/or non-erasable marking compositions.

The viscosity of the erasable marking composition must be suitable for the desired or intended delivery means. Generally, the erasable marking composition of the present invention will have a Brookfield viscosity at 25° C. of less than about 10 cps, preferably between about 5.5 cps and 8.5 cps, for use in capillary feed markers and similar writing instruments. However, it is to be understood that the erasable marking composition of the present invention is not limited to the aforementioned viscosity range and that the erasable marking composition of the present invention may possess lower viscosities or viscosities of up to several thousand cps or higher when specifically formulated for other applications, such as when formulated as an ink for use in ballpoint or fountain pens or when formulated as a paint for use with brushes, rollers or the like. Although the erasable marking composition of the present invention is typically formulated to be non-shear-thinning, thickeners, both thixotropic and otherwise, may be included therein.

As noted above, although the erasable marking composition of the present invention is particularly well-suited for use in capillary feed markers and similar porous-tipped writing instruments, said composition is not limited to such delivery means and may be used in certain ballpoint pens and other suitable writing instruments.

The following example of an erasable marking composition prepared according to the present invention is provided merely to illustrate the principles of the present invention and should not be used to limit the scope of the invention.

EXAMPLE

| Ingredient | % Solids | Dry Weight (gms) | % Wet Weight |
| --- | --- | --- | --- |
| Sorbitol | 70 | 2.24 | 3.20 |
| Glycerine | 100 | 1.20 | 1.20 |
| Urea | 100 | 0.70 | 0.70 |
| Distilled Water | — | — | 21.00 |
| Dowicil 75 | 100 | 0.16 | 0.16 |
| Butofan® NS 103 | 47 | 27.76 | 59.07 |
| PLIOLITE® LPF-2108 | 40 | 1.24 | 3.11 |
| Potassium oleate | 25 | 1.50 | 6.00 |
| Octolite 453 | 55 | 0.69 | 1.26 |
| Unisperse Black B-PI | 45 | 1.71 | 3.80 |
| Fluorad FC-129 | 50 | 0.25 | 0.50 |
| Total | | 37.45 | 100 |
| Brookfield viscosity of entire composition at 25° C. | | 6.18 cps | |
| Surface Tension of entire composition at 25° C. | | 24.30 dynes/cm | |

Figure 2:
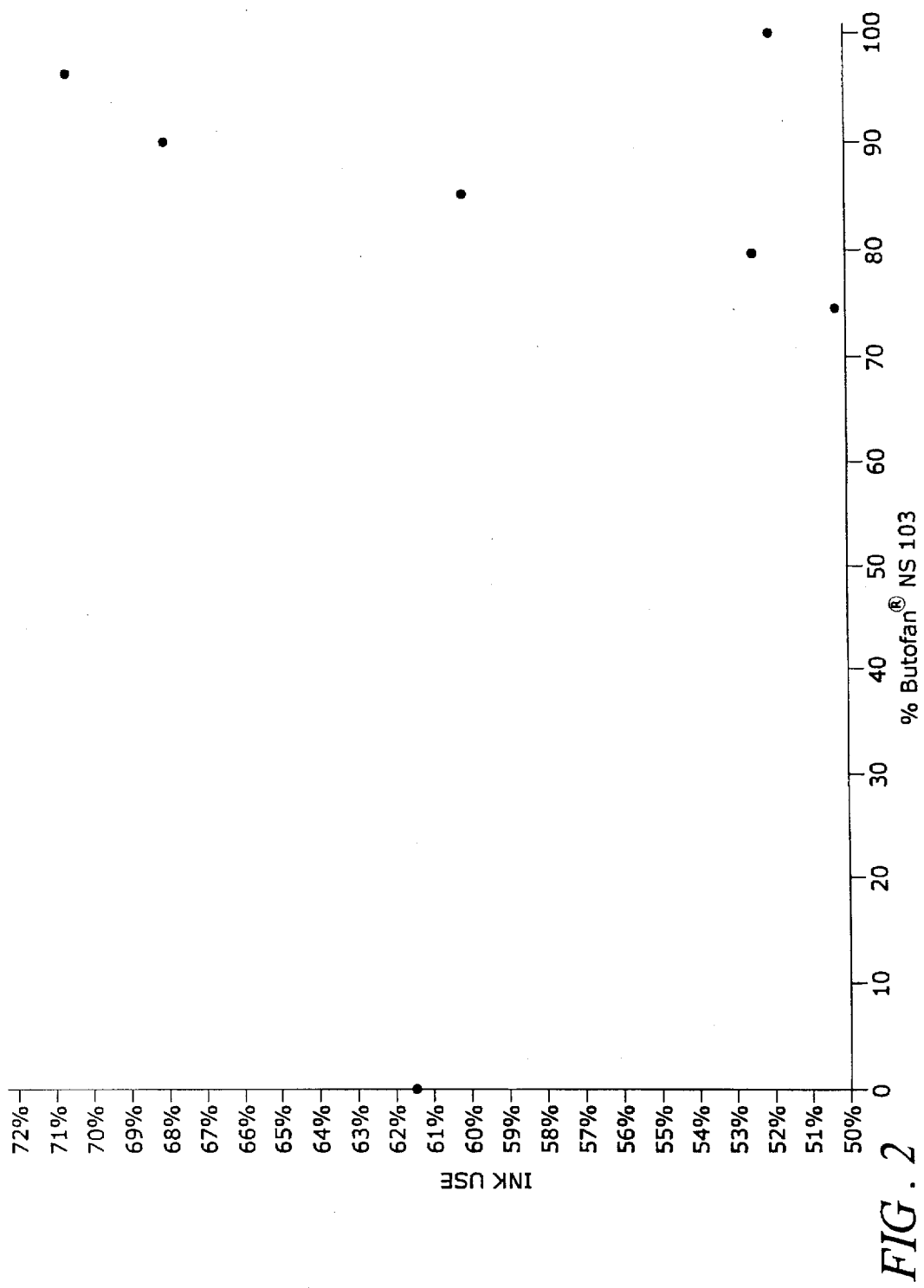
FIG. 2 is a graphic representation of ink use through a capillary feed marker measured as a function of the ratio of Butofan® NS 103 to PLIOLITE® LPF-2108 in the erasable marking composition of the present invention.
Figure 3:
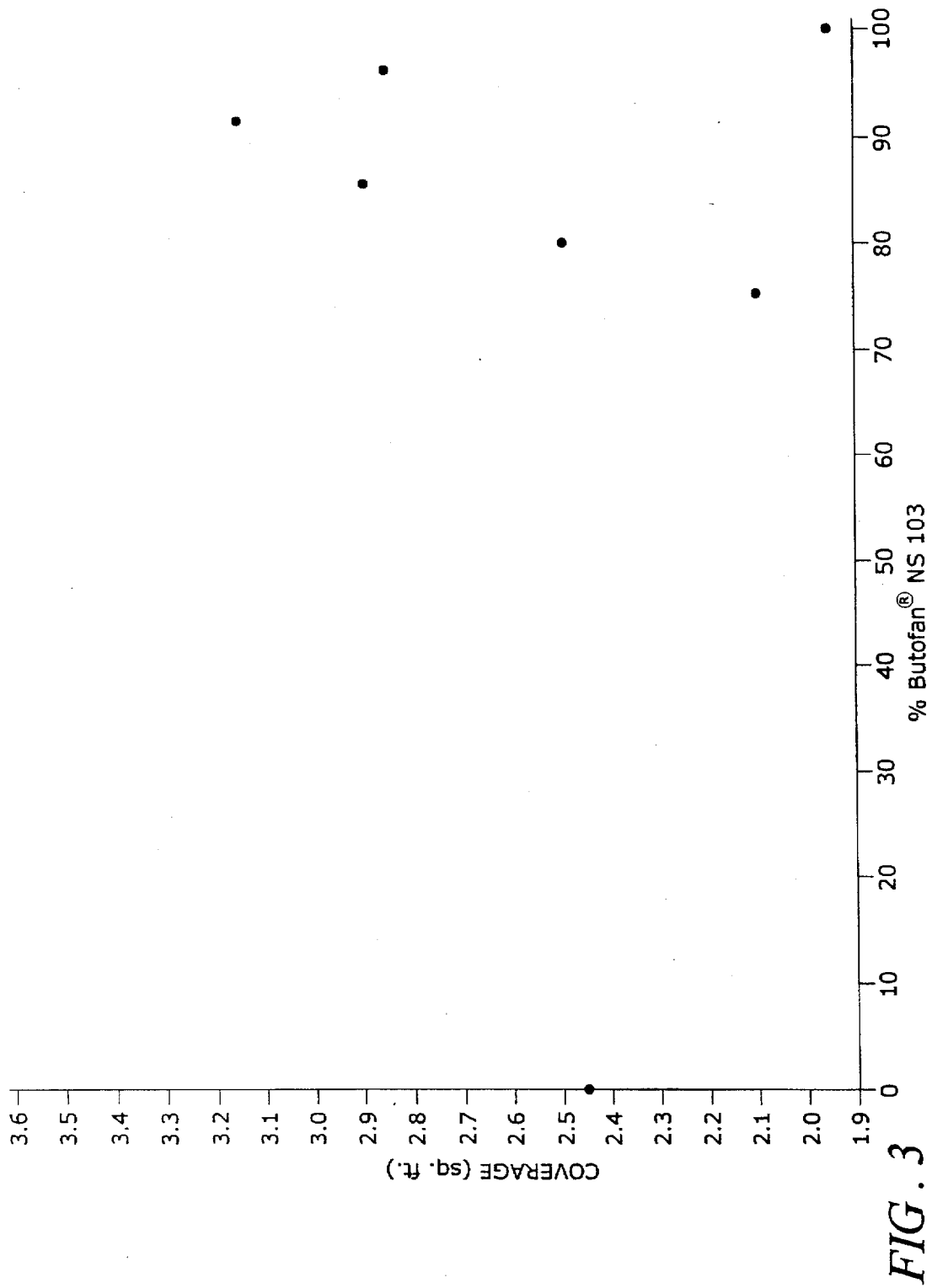
FIG. 3 is a graphic representation of coverage through a capillary feed marker measured as a function of the ratio of Butofan® NS 103 to PLIOLITE® LPF-2108 in the erasable marking composition of the present invention.

Referring now to FIGS. 1 through 3, there are graphically depicted the writing performance characteristics of ink feed (i.e., the amount of ink dispensed from a capillary feed marker after 100 feet of writing), ink use (i.e., the total percentage of ink that is dispensed from a capillary feed marker after continuous use) and coverage (i.e., the total amount, in square feet, of ink dispensed by a capillary feed marker), respectively, which were observed for a series of erasable marking compositions having a Butofan® NS 103:PLIOLITE® LPF-2108 ratio of between about 75:25 and 100:0 and prepared in accordance with the teachings of the present invention. Also shown for comparative purposes in FIGS. 1 through 3 are the respective writing performance characteristics for a similarly prepared erasable marking composition containing 100% PLIOLITE® LPF-2108 as the latex emulsion. As can be seen in FIGS. 1 through 3, the ink having a Butofan® NS 103:PLIOLITE® LPF-2108 ratio of about 95:5 performed at a consistently superior level.

The erasable marking composition of the present invention has also been observed to possess superior color intensity and erasability properties, as compared to comparable inks containing 100% PLIOLITE® LPF-2108 as the latex emulsion. Without wishing to be limited by any theory of the invention, the present inventors believe that the improvement in erasability in the present composition is attributable, to a large extent, to the fact that Butanol® NS 103 has a higher rubber solids content than does PLIOLITE® LPF-2108.

Furthermore, the erasable marking composition of the present invention has also been observed to possess an improvement of up to about 33% in cap-off time (i.e., the length of time for an uncovered capillary feed marker containing the ink to dry out), as compared to comparable inks containing 100% PLIOLITE® LPF-2108 as the latex emulsion.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A marking composition erasable from porous marking substrates using an ordinary pencil eraser, said marking composition having a viscosity less than about 10 cps, a surface tension of between about 20 dynes/cm and about 40 dynes/cm and comprising:
   (a) a latex emulsion having a viscosity greater than about 50 cps, said latex emulsion comprising a discontinuous rubber phase of non-carboxylated styrene-butadiene copolymer and a continuous aqueous carrier phase, said emulsion being characterized by its ability to be transformed, upon being contacted with the surface of a porous marking substrate, from a first state in which said latex emulsion is stable to a second state in which said latex emulsion is unstable and the discontinuous rubber phase rapidly agglomerates to form a cohesive rubber phase film deposited directly on the surface of the sheet of the porous marking substrate and erasable therefrom with an ordinary pencil eraser; and
   (b) a colorant dispersed in the emulsion, the colorant being characterized by its association with the cohesive rubber phase film when said emulsion is transformed into said second state.

2. The marking composition as claimed in claim 1 wherein said marking composition is non-shear-thinning.

3. The marking composition as claimed in claim 1 wherein said latex emulsion has a surface tension of between about 25 dynes/cm and about 35 dynes/cm.

4. The marking composition as claimed in claim 1 wherein said latex emulsion has a styrene-butadiene ratio of between about 20:80 and about 30:70.

5. The marking composition as claimed in claim 1 wherein said discontinuous rubber phase has a particle size of about 650–700 Angstroms.

6. The marking composition as claimed in claim 1 wherein said latex emulsion is a blend of at least two different non-carboxylated styrene-butadiene latex emulsions.

7. The marking composition as claimed in claim 6 wherein a first of said at least two non-carboxylated styrene-butadiene latex emulsions contains about 40% total solids by weight and has a viscosity of about 30 cps, a pH of about 11.2, a Mooney value of about 150–160, a surface tension of about 55–60 dynes/cm, and a bound styrene content of about 21–29% and wherein a second of said at least two non-carboxylated styrene-butadiene latex emulsions contains about 47% total solids by weight and has a viscosity of about 200 cps, a pH of about 9.7, a Mooney value of about 70–75, a surface tension of about 62 dynes/cm, and a bound styrene content of about 24%.

8. The marking composition as claimed in claim 7 wherein the ratio of said second non-carboxylated styrene-butadiene latex emulsion to said first non-carboxylated styrene-butadiene latex emulsion is greater than or equal to about 75:25 and is less than 100:0.

9. The marking composition as claimed in claim 8 wherein the ratio of said second non-carboxylated styrene-butadiene latex emulsion to said first non-carboxylated styrene-butadiene latex emulsion is about 95:5.

10. The marking composition as claimed in claim 7 further comprising a shear-stabilizing agent.

11. The marking composition as claimed in claim 10 wherein said shear-stabilizing agent is a fatty acid salt.

12. The marking composition as claimed in claim 11 wherein said shear-stabilizing agent is potassium oleate.

13. The marking composition as claimed in claim 12 wherein said shear-stabilizing agent is present in the marking composition in an amount approximating 1–4%, dry weight, of the dry weight of the non-carboxylated styrene-butadiene copolymer of said latex emulsion.

14. The marking composition as claimed in claim 1 wherein said latex emulsion contains about 47% total solids by weight and has a viscosity of about 200 cps, a pH of about 9.7, a Mooney value of about 70–75, a surface tension of about 62 dynes/cm, and a bound styrene content of about 24%.

15. The marking composition as claimed in claim 14 further comprising a shear-stabilizing agent.

16. The marking composition as claimed in claim 15 wherein said shear-stabilizing agent is a fatty acid salt.

17. The marking composition as claimed in claim 16 wherein said shear-stabilizing agent is potassium oleate.

18. The marking composition as claimed in claim 17 wherein said shear-stabilizing agent is present in the marking composition in an amount approximating 1–4%, dry weight, of the dry weight of the non-carboxylated styrene-butadiene copolymer of said latex emulsion.

19. The marking composition as claimed in claim 1 further comprising a humectant.

20. The marking composition as claimed in claim 1 further comprising a preservative.

21. The marking composition as claimed in claim 1 further comprising a fluorochemical surfactant.

22. The marking composition as claimed in claim 10 further comprising a fluorochemical surfactant.

23. A marking composition erasable from porous marking substrates using an ordinary pencil eraser, said marking composition comprising:
   (a) a latex emulsion having a viscosity greater than about 50 cps, said latex emulsion comprising a discontinuous rubber phase of non-carboxylated styrene-butadiene copolymer, said non-carboxylated styrene-butadiene copolymer having a particle size of about 700 Angstroms, and a continuous aqueous carrier phase, said emulsion being characterized by its ability to be transformed, upon being contacted with the surface of a porous marking substrate, from a first state in which said latex emulsion is stable to a second state in which said latex emulsion is unstable and the discontinuous rubber phase rapidly agglomerates to form a cohesive rubber phase film deposited directly on the surface of the sheet of the porous marking substrate and erasable therefrom with an ordinary pencil eraser; and
   (b) a colorant dispersed in the emulsion, the colorant being characterized by its association with the cohesive rubber phase film when said emulsion is transformed into said second state.

24. The marking composition as claimed in claim 23 wherein said latex emulsion contains about 47% total solids by weight and has a viscosity of about 200 cps, a pH of about 9.7, a Mooney value of about 70–75, a surface tension of about 62 dynes/cm, and a bound styrene content of about 24%.

25. The marking composition as claimed in claim 24 further comprising a shear-stabilizing agent.

26. The marking composition as claimed in claim 25 wherein said shear-stabilizing agent is a fatty acid salt.

27. The marking composition as claimed in claim 26 wherein said shear-stabilizing agent is potassium oleate.

28. The marking composition as claimed in claim 27 wherein said shear-stabilizing agent is present in the marking composition in an amount approximating 1–4%, dry weight, of the dry weight of the non-carboxylated styrene-butadiene copolymer of said latex emulsion.

29. The marking composition as claimed in claim 25 further comprising a fluorochemical surfactant.

30. The marking composition as claimed in claim 23 wherein said marking composition has a viscosity of less than about 10 cps and a surface tension of between about 20 dynes/cm and about 40 dynes/cm.

31. (Amended) A marking composition erasable from porous marking substrates using an ordinary pencil eraser, said marking composition comprising:

(a) a latex emulsion blend comprising a first non-carboxylated styrene-butadiene latex emulsion and a second non-carboxylated styrene-butadiene latex emulsion, said latex emulsion blend being characterized by its ability to be transformed, upon being contacted with the surface of a porous marking substrate, from a first state in which said latex emulsion blend is stable to a second state in which said latex emulsion blend is unstable and the styrene-butadiene phase rapidly agglomerates to form a cohesive film deposited directly on the surface of the sheet of the porous marking substrate and erasable therefrom with an ordinary pencil eraser; and (b) a colorant dispersed in the latex emulsion blend, the colorant being characterized by its association with the cohesive rubber phase film when said latex emulsion blend is transformed into said second state.

32. The marking composition as claimed in claim 31 wherein said latex emulsion blend has a viscosity of at least about 50 cps.

33. The marking composition as claimed in claim 31 wherein said first non-carboxylated styrene-butadiene latex emulsion contains about 40% total solids by weight and has a viscosity of about 30 cps, a pH of about 11.2, a Mooney value of about 150–160, a surface tension of about 55–60 dynes/cm, and a bound styrene content of about 21–29% and wherein said second non-carboxylated styrene-butadiene latex emulsion contains about 47% total solids by weight and has a viscosity of about 200 cps, a pH of about 9.7, a Mooney value of about 70–75, a surface tension of about 62 dynes/cm, and a bound styrene content of about 24%.

34. The marking composition as claimed in claim 33 wherein the ratio of said second non-carboxylated styrene-butadiene latex emulsion to said first non-carboxylated styrene-butadiene latex emulsion is greater than or equal to about 75:25 and is less than 100:0.

35. The marking composition as claimed in claim 34 wherein the ratio of said second non-carboxylated styrene-butadiene latex emulsion to said first non-carboxylated styrene-butadiene latex emulsion is about 95:5.

36. The marking composition as claimed in claim 33 further comprising a shear-stabilizing agent.

37. The marking composition as claimed in claim 36 wherein said shear-stabilizing agent is a fatty acid salt.

38. The marking composition as claimed in claim 37 wherein said shear-stabilizing agent is potassium oleate.

39. The marking composition as claimed in claim 38 wherein said shear-stabilizing agent is present in the marking composition in an amount approximating 1–4%, dry weight, of the dry weight of the non-carboxylated styrene-butadiene copolymer of said latex emulsion.

40. The marking composition as claimed in claim 36 further comprising a fluorochemical surfactant.

41. The marking composition as claimed in claim 31 wherein said marking composition has a viscosity of less than about 10 cps.

42. The marking composition as claimed in claim 31 wherein said marking composition has a surface tension of between about 20 dynes/cm and about 40 dynes/cm.

43. The marking composition as claimed in claim 31 wherein said latex emulsion blend has a rubber particle size of about 650–700 Angstroms.

44. (Amended) A marking composition erasable from porous marking substrates using an ordinary pencil eraser, said marking composition comprising:

(a) a latex emulsion having a Mooney value of about 70–75, said latex emulsion comprising a discontinuous rubber phase of non-carboxylated styrene-butadiene copolymer and a continuous aqueous carrier phase, said emulsion being characterized by its ability to be transformed, upon being contacted with the surface of a porous marking substrate, from a first state in which said latex emulsion is stable to a second state in which said latex emulsion is unstable and the discontinuous rubber phase rapidly agglomerates to form a cohesive rubber phase film deposited directly on the surface of the sheet of the porous marking substrate and erasable therefrom with an ordinary pencil eraser; and (b) a colorant dispersed in the emulsion, the colorant being characterized by its association with the cohesive rubber phase film when said emulsion is transformed into said second state.

45. The marking composition as claimed in claim 44 wherein said non-carboxylated styrene-butadiene latex emulsion contains about 47% total solids by weight and has a viscosity of about 200 cps and a bound styrene content of about 24%.

46. The marking composition as claimed in claim 44 further comprising a shear-stabilizing agent.

47. The marking composition as claimed in claim 46 wherein said shear-stabilizing agent is potassium oleate.

48. The marking composition as claimed in claim 47 wherein the marking composition has a viscosity of less than about 10 cps and has a surface tension between about 25 dynes/cm and about 35 dynes/cm.

* * * * *